United States Patent
Hall

(10) Patent No.: US 8,792,176 B2
(45) Date of Patent: Jul. 29, 2014

(54) PROJECTION DEVICE FOR USE WITH A NIGHT VISION GOGGLE SYSTEM

(75) Inventor: John M. Hall, Stafford, VA (US)

(73) Assignee: Manufacturing Techniques, Inc., Kilmarnock, VA (US)

( * ) Notice: Subject to any disclaimer, the term of this patent is extended or adjusted under 35 U.S.C. 154(b) by 0 days.

(21) Appl. No.: 13/595,023

(22) Filed: Aug. 27, 2012

(65) Prior Publication Data

US 2013/0050836 A1    Feb. 28, 2013

Related U.S. Application Data

(60) Provisional application No. 61/528,407, filed on Aug. 29, 2011.

(51) Int. Cl.
G02B 27/14 (2006.01)

(52) U.S. Cl.
USPC ............................................. 359/630

(58) Field of Classification Search
USPC ............................................. 359/630
See application file for complete search history.

(56) References Cited

U.S. PATENT DOCUMENTS

| | | |
|---|---|---|
| 4,000,419 A | 12/1976 | Crost et al. |
| 4,915,487 A | 4/1990 | Riddell, III et al. |
| 4,961,626 A | 10/1990 | Fournier, Jr. et al. |
| 4,969,714 A | 11/1990 | Fournier, Jr. et al. |
| 5,113,177 A | 5/1992 | Cohen |
| 5,136,421 A | 8/1992 | Sagan |
| 5,325,237 A | 6/1994 | Sagan |
| 5,355,224 A | 10/1994 | Wallace |
| 5,502,455 A | 3/1996 | Ferrin et al. |
| 5,506,728 A | 4/1996 | Edwards et al. |
| 5,734,506 A | 3/1998 | Williams |
| 5,880,888 A | 3/1999 | Schoenmakers et al. |
| 6,999,239 B1 | 2/2006 | Martins et al. |
| 7,541,581 B2 | 6/2009 | Reed et al. |
| 7,586,686 B1 | 9/2009 | Hall |
| 7,636,199 B2 | 12/2009 | Francois et al. |
| 7,755,837 B2 | 7/2010 | Yamamoto |
| 2003/0030596 A1* | 2/2003 | Park ................................ 345/8 |
| 2010/0014166 A1 | 1/2010 | Schoenenberger et al. |
| 2010/0284090 A1 | 11/2010 | Simmonds |

* cited by examiner

*Primary Examiner* — James Jones
(74) *Attorney, Agent, or Firm* — The Webb Law Firm

(57) ABSTRACT

A projection device for use with a night vision goggle system includes: a display source; a projector lens assembly positioned to accept light from the display source and provide a projector optical path having a plurality of projector rays; and a folding device comprising at least two folding surfaces positioned to split an exit pupil of the projector optical path into two or more separated segments. Each folding surface captures and redirects a portion of the projector rays to be parallel and coincident with corresponding rays produced by an external scene which pass through an objective lens of the night vision goggle system.

20 Claims, 3 Drawing Sheets

PROJECTION DEVICE FOR USE WITH A NIGHT VISION GOGGLE SYSTEM

CROSS REFERENCE TO RELATED APPLICATIONS

This application claims the benefit of U.S. Provisional Patent Application No. 61/528,407 entitled "Split Pupil Coupler for Night Vision Goggle Display" filed Aug. 29, 2011, which is hereby incorporated by reference in its entirety.

BACKGROUND OF THE INVENTION

1. Field of the Invention

The present invention relates, in general, to an optical system and, more particularly, to an optical system for allowing the superposition of an electronic image formed by a projection device on an image coming from external scenery generated by a night vision goggle system.

2. Description of Related Art

Night vision goggles have been employed by the military services around the world for many years. A typical use for such goggles is navigation and situational awareness, for which the industry standard is to provide a 40° circular field of view (FOV). For use in night time or other similar very low light level conditions, the goggles are equipped with fast objective lenses where the entrance aperture diameter is nearly the same dimension as the lens focal length. The larger the lens aperture diameter, the more light gets through and hence the brighter the image. However, due to optical design complexity, the desire for small size and weight, and the need to reduce stray light reflections, most goggle objective lenses have a large degree of vignetting whereby the entering ray bundle diameters for the edges of the field of view are smaller than the ray bundle diameters for the central field of view.

With reference to FIG. 1, military specifications typically allow a "relative illumination" value of 40%, meaning the edge fields may have only 40% of the brightness as the central fields of view. In practice, the edge field vignetting is typically such that the light rays do not pass through the center of the outermost lens surface. This is a widely known phenomena when the "pinhole cap" is attached to a goggle so that it can be used in daytime conditions or when an increased depth of field is needed. The cap centers the pinhole on the central axis of the first lens surface, and substantially reduces the incoming ray bundle diameters for all fields of view. However, the edge field ray bundles are often completely obscured by the cap, and thus will never "see" through the pinhole. From an observer's point of view, the total field of view of the goggle is thereby reduced.

The objective lens vignetting problem discussed hereinabove also created difficulties for prior art systems that utilized an external projector attached to the goggles in order to import either symbology or full video overlay. A typical example of this kind of device is the Aviator's Night Vision Imaging System Head Up Display (ANVIS-HUD) as built by Elbit Systems, Inc. and which has been fielded by the United States military for many years. Another similar application which has recently emerged is the Clip-on Thermal Imager (COTI). This application utilizes an extra infrared camera that is attached to a standard night vision goggle and the camera image is projected in through the objective lens in much the same manner as the ANVIS-HUD. In all cases, the projector system is comprised of a display source which emits light into a set of collimation optics. The exit pupil of the collimation optics is then folded into the direction of view of the goggle objective lens. The folding may be via a small mirror or a coated dielectric surface such as may be found in a prism or plate beamsplitter. Currently, none of these projection systems features the ability to project an exterior image such that it completely fills the available 40° circular field of view of the goggle.

Much like the "Pinhole Cap" problem discussed hereinabove, the goggle objective lens vignetting would drive a conventional projector approach to have an exceptionally large projection exit pupil, which in turn would make the projection optic assembly extremely bulky and heavy. Typical performance based on literature surveys for all of the prior art systems is fields of view ranging from 20° to 32°. Even at the maximum projected field of 32° circular, the amount of visual area lost, compared to the available 40° of the normal goggle, is a significant 36%.

Accordingly, a need exists for a projection display attachment for a standard night vision goggle system that provides a 40° field of coverage without a substantial increase in size and weight of the standard night vision goggle system.

SUMMARY OF THE INVENTION

An objective of the system of the present invention is to provide a projection display attachment for a standard night vision goggle system that provides a 40° field of coverage without a substantial increase in size and weight of the standard night vision goggle system. More specifically, the objective of the present invention is to provide a system for inserting a projected image into a standard wide field of view night vision goggle objective lens such that the projected image can cover the full field of view angular range normally provided by the night vision goggle, while at the same time providing a minimal amount of obscuration such that the night vision goggle can be used normally.

Accordingly, provided is a projection device for use with a night vision goggle system. The projection device includes: a display source; a projector lens assembly positioned to accept light from the display source and provide a projector optical path having a plurality of projector rays; and a folding device comprising at least two folding surfaces positioned to split an exit pupil of the projector optical path into two or more separated segments. Each folding surface captures and redirects a portion of the projector rays to be parallel and coincident with corresponding rays produced by an external scene which pass through an objective lens of the night vision goggle system.

The folding device may include two folding surfaces, such as a first folding surface that intercepts a left side ray bundle of the plurality of projector rays prior to the exit pupil of the projector optical path and a second folding surface intercepts remaining ray bundles after the exit pupil of the projector optical path. The folding surfaces may be two or more mounted mirror assemblies which provide a minimum obscuration in a normal field of vision of the objective lens of the night vision goggle system. Alternatively, the folding device may be formed by sandwiching reflective surfaces within an otherwise transmissive optical element which permits a normal field of vision of the objective lens of the night vision goggle system. As another alternative, the folding device may be formed by etching diffractive surfaces within an otherwise transmissive or reflective optical element which permits a normal field of vision of the objective lens of the night vision goggle system.

The projector lens assembly may be positioned substantially perpendicularly to the objective lens of the night vision goggle system. An output of the display source may be at least one of collimated and adjusted to a desired diopter focus position by moving the display source towards or away from the projector lens assembly. A light baffle may be provided to capture and absorb any projector light that is not intercepted by the folding device. The projection device may be configured to be positioned within a housing that is attachable to the night vision goggle system. The night vision goggle system may be, for example, an AN/PVS-14 night vision goggle.

Also provided is a night vision goggle system that includes: a goggle objective lens; and a projection device positioned substantially perpendicularly to the goggle objective lens. The projection device includes: a display source; a projector lens assembly positioned to accept light from the display source and provide a projector optical path having a plurality of projector rays; and a folding device comprising at least two folding surfaces positioned to split an exit pupil of the projector optical path into two or more separated segments. Each folding surface captures and redirects a portion of the projector rays to be parallel and coincident with corresponding rays produced by an external scene which pass through the goggle objective lens.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE PREFERRED EMBODIMENTS

Figure 1:
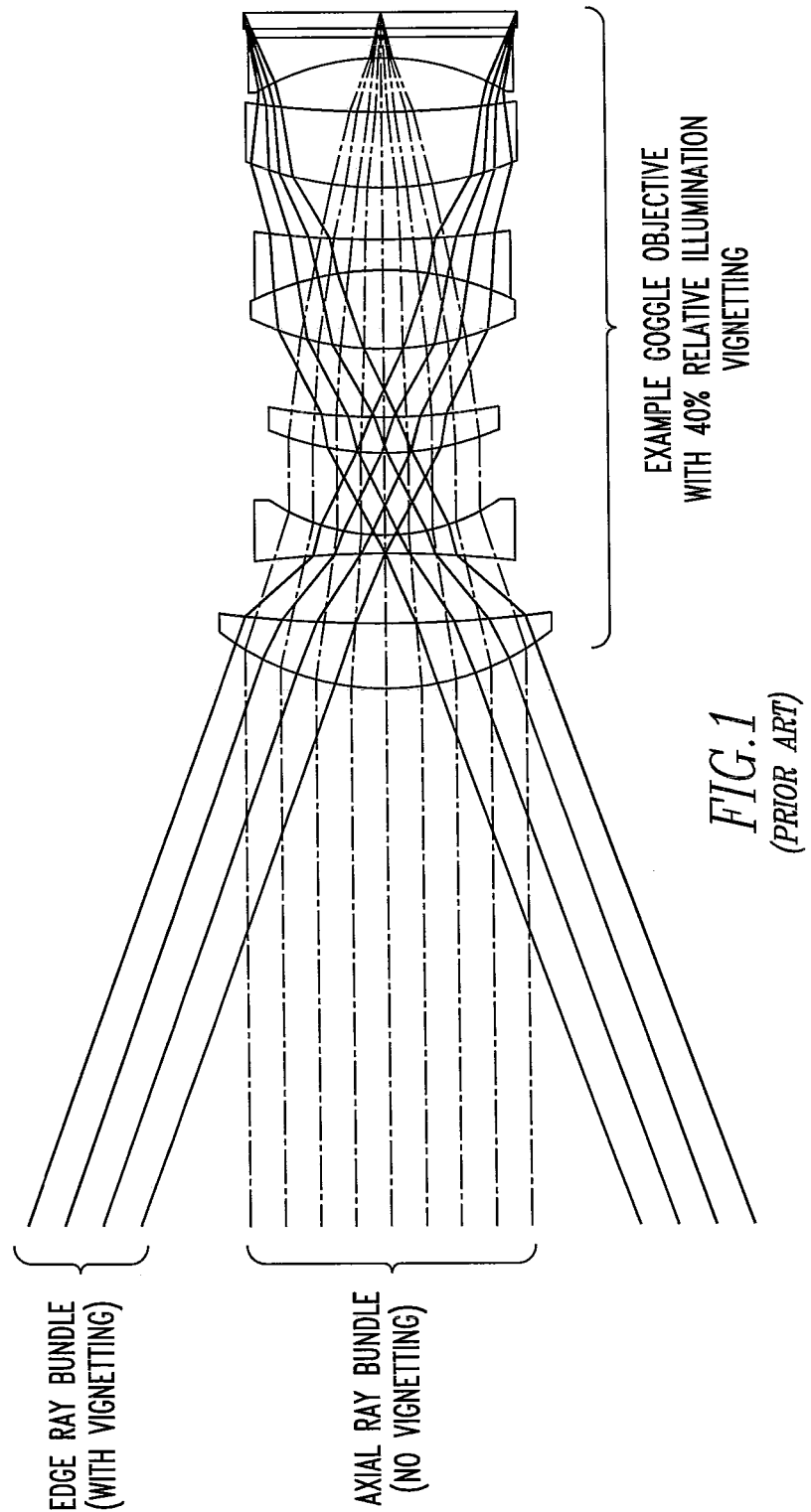
FIG. 1 is a schematic, side view of an objective lens of a conventional night vision goggle system illustrating ray traces of light entering the objective lens.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As discussed in greater detail hereinafter with reference to FIGS. 2 and 3, the system of the present invention employs a "split-pupil" approach for the projection optical system. Instead of utilizing the conventional technique of folding the whole projector pupil into the objective lens of the night vision goggle system, the system of the present invention employs a folding device that produces two or more fold points which extract (i.e., "split") a portion of the projection pupil and which are spaced a sufficient distance such that any point within the normal goggle field of view is covered by at least one of the multiple fold points from the projector system.

Figure 2:
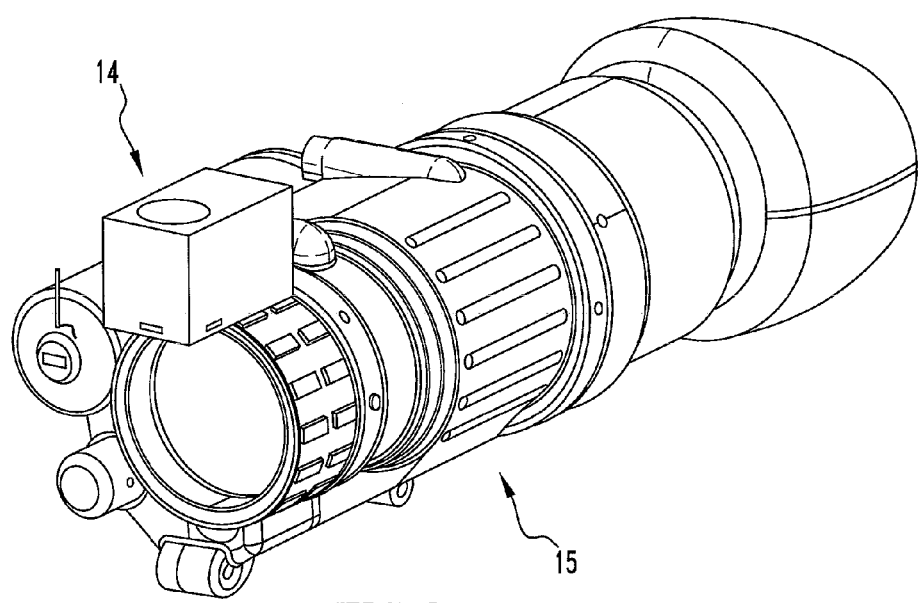
FIG. 2 is a perspective view of a night vision goggle system with a projector device in accordance with the present invention mounted thereto.

With reference to FIG. 2, the projection device of the present invention may be positioned within a housing 14 that is attached to a standard AN/PVS-14 night vision goggle 15. The AN/PVS-14 night vision goggle 15 is a multifunctional night vision system that may be hand-held as a monocular; head-mounted or helmet-mounted as a single-eye goggle; or weapon-mounted as a night scope. The manner in which the housing 14 is attached to the AN/PVS-14 night vision goggle 15 is not illustrated in FIG. 2 but may include a ring-clamp that goes around the goggle lens barrel, a glue-bond directly to the top of the goggle, or any other suitable mounting method.

Figure 3:
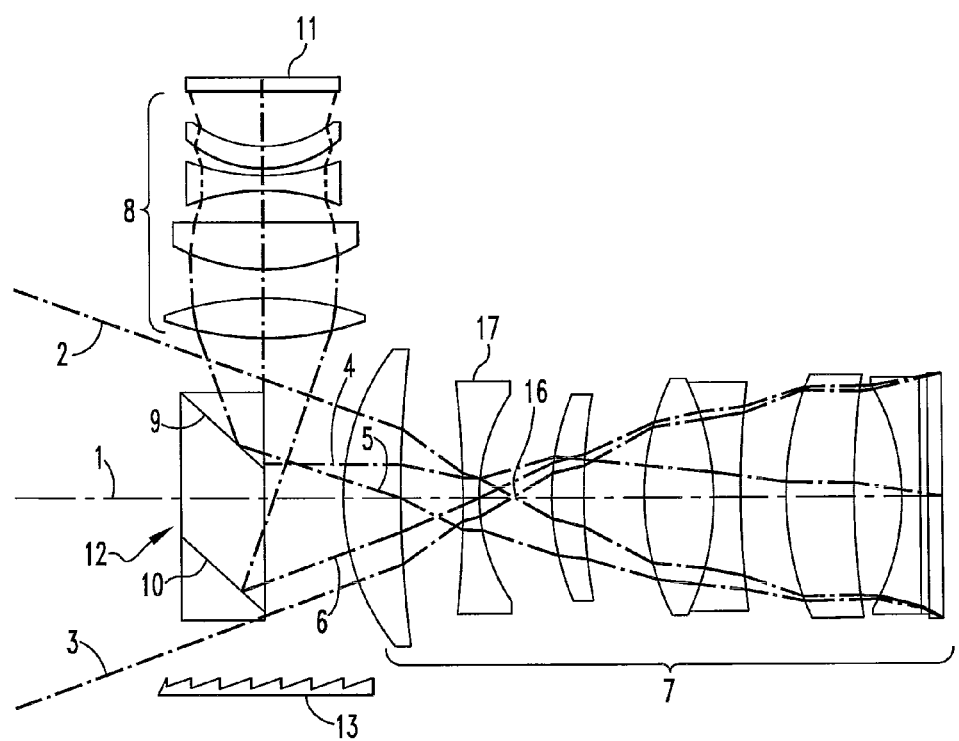
FIG. 3 is a schematic, side view of an optical system in accordance with the present invention illustrating ray traces from the projector device being folded with light from the night vision goggle system.

With reference to FIG. 3 and with continuing reference to FIG. 2, the projection device includes a display source 11; a projector lens assembly 8 positioned to accept light from the display source 11 and provide a projector optical path having a plurality of projector rays; and a folding device 12.

An objective lens 7 of the night vision goggle system 15 is shown with its axial chief ray 1 locating the center of the on-axis field of view bundle obtained from an external scene, and the upper chief ray 2 and lower chief ray 3 locating the centers of the edge field ray bundles of an external scene. In optical terms, a "pupil" is defined as the location where the axial and edge chief rays cross each other. In this case, the pupil 16 of the objective lens 7 is seen to be "inside" the objective lens assembly, just after the second lens 17 from the left.

The projector lens assembly 8 accepts light from the two-dimensional display source 11 and collimates the light as it heads toward the objective lens 7. An output of the display source 11 may be collimated or adjusted to a desired diopter focus position by moving the display source 11 towards or away from the projector lens assembly 8. In addition, the projector lens assembly 8 is provided substantially perpendicularly to the objective lens 7. Accordingly, a folding technique is required to direct the light from the projection device into the objective lens 7.

An embodiment of the "split pupil" folding device 12 in accordance with the present invention is illustrated in FIG. 3 as including a first folding surface 9 and a second folding surface 10. However, this is not to be construed as limiting the present invention as any suitable number of folding surfaces may be utilized. The folding device 12 intercepts portions of the exiting projector ray bundles, both before and after a theoretical pupil position of the projector lens assembly 8. The first folding surface 9 intercepts the left side ray bundles of the exiting projector ray bundles prior to the pupil convergence, and the second folding surface 10 intercepts the remaining rays after the theoretical pupil position.

More specifically, the first folding surface 9 is positioned to capture the chief ray 4 of an axial image produced by the projection device and the right edge chief ray 5 thereof. The chief ray 4 of an axial image produced by the projection device is thus folded to be parallel with the goggle objective axial chief ray 1 and will thus enter the objective lens 7 of the night vision goggle system 15. The right edge chief ray 5 of an axial image produced by the projection device is also intercepted and folded parallel to the objective lens upper chief ray 2, and thus will pass through the objective lens 7 of the night vision goggle system 15. The second folding surface 10 intercepts the left edge chief ray 6 of the axial image produced by the projection device and folds it parallel to the objective lower edge chief ray 3, and thus will pass through the objective lens 7 of the night vision goggle system 15.

A light baffle 13 may be provided to capture light coming from the projection device that does not otherwise get reflected into the objective lens 7 of the night vision goggle system 15. The light baffle 13 may be embodied as a piece of black polymeric material. However, this is not to be construed as limiting the present invention, as any suitable light absorbing material may be utilized as the light baffle 13.

The split pupil folding device 12 may be configured in a number of ways to achieve the above described results. For instance, the folding device 12 may include two or more separate mirrors positioned in air space and held by a bracket. Alternatively, the folding device 12 may be formed by sandwiching reflective fold surfaces into a refractive plate which covers the entire aperture of the objective lens 7. The fold surfaces may be contained within a single plane, or separated in both x and y coordinates. The requirement is that the folding surfaces intercept a portion of the projector pupil and bend the projector rays 4, 5, and 6 so that they are parallel and coincident with the corresponding rays 1, 2, and 3 that pass through the objective lens 7 of the night vision goggle system 15.

Accordingly, the projection device of the present invention circumvents the significant issue of goggle objective lens vignetting, which is a major obstacle in designing a compact and lightweight goggle objective projection device which covers the full field of view of the goggle. Furthermore, the dimensions of the folding surfaces can be used to tailor the sizes of the projection optics as well as to minimize the amount of obscuration in front of the night vision goggle objective lens.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

The invention claimed is:

1. A projection device for use with a night vision goggle system, the projection device comprising:
    a display source;
    a projector lens assembly positioned to accept light from the display source and provide a projector optical path comprising a plurality of projector rays; and
    a folding device comprising at least two folding surfaces positioned to split an exit pupil of the projector optical path into two or more separated segments,
    wherein each folding surface captures and redirects a portion of the projector rays to be parallel and coincident with corresponding rays produced by an external scene which pass through an objective lens of the night vision goggle system.

2. The projection device of claim 1, wherein the folding device comprises two folding surfaces.

3. The projection device of claim 2, wherein a first folding surface intercepts a left side ray bundle of the plurality of projector rays prior to the exit pupil of the projector optical path and a second folding surface intercepts remaining ray bundles after the exit pupil of the projector optical path.

4. The projection device of claim 1, wherein the folding surfaces are two or more mounted mirror assemblies which provide a minimum obscuration in a normal field of vision of the objective lens of the night vision goggle system.

5. The projection device of claim 1, wherein the folding device is formed by sandwiching reflective surfaces within an otherwise transmissive optical element which permits a normal field of vision of the objective lens of the night vision goggle system.

6. The projection device of claim 1, wherein the folding device is formed by etching diffractive surfaces within an otherwise transmissive or reflective optical element which permits a normal field of vision of the objective lens of the night vision goggle system.

7. The projection device of claim 1, wherein the projector lens assembly is positioned substantially perpendicularly to the objective lens of the night vision goggle system.

8. The projection device of claim 1, wherein an output of the display source is at least one of collimated and adjusted to a desired diopter focus position by moving the display source towards or away from the projector lens assembly.

9. The projection device of claim 1, wherein a light baffle is provided to capture and absorb any projector light that is not intercepted by the folding device.

10. The projection device of claim 1, wherein the projection device is configured to be positioned within a housing that is attachable to the night vision goggle system.

11. A night vision goggle system comprising:
    a goggle objective lens; and
    a projection device positioned substantially perpendicularly to the goggle objective lens and comprising:
        a display source;
        a projector lens assembly positioned to accept light from the display source and provide a projector optical path comprising a plurality of projector rays; and
        a folding device comprising at least two folding surfaces positioned to split an exit pupil of the projector optical path into two or more separated segments,
    wherein each folding surface captures and redirects a portion of the projector rays to be parallel and coincident with corresponding rays produced by an external scene which pass through the goggle objective lens.

12. The night vision goggle system of claim 11, wherein the folding device comprises two folding surfaces.

13. The night vision goggle system of claim 12, wherein a first folding surface intercepts a left side ray bundle of the plurality of projector rays prior to the exit pupil of the projector optical path and the second folding surface intercepts remaining ray bundles after the exit pupil of the projector optical path.

14. The night vision goggle system of claim 11, wherein the folding surfaces are two or more mounted mirror assemblies which provide a minimum obscuration in a normal field of vision of the objective lens of the night vision goggle system.

15. The night vision goggle system of claim 11, wherein the folding device is formed by sandwiching reflective surfaces within an otherwise transmissive optical element which permits a normal field of vision of the objective lens of the night vision goggle system.

16. The night vision goggle system of claim 11, wherein the folding device is formed by etching diffractive surfaces within an otherwise transmissive or reflective optical element which permits a normal field of vision of the objective lens of the night vision goggle system.

17. The night vision goggle system of claim 11, wherein an output of the display source is at least one of collimated and adjusted to a desired diopter focus position by moving the display source towards or away from the projector lens assembly.

18. The night vision goggle system of claim 11, wherein a light baffle is provided to capture and absorb any projector light that is not intercepted by the folding device.

19. The night vision goggle system of claim 11, wherein the projection device is configured to be positioned within a housing that is attachable to the night vision goggle system.

20. The night vision goggle system of claim 19, wherein the night vision goggle system is an AN/PVS-14 night vision goggle.

* * * * *